United States Patent Office 3,257,210
Patented June 21, 1966

3,257,210
POULTRY FEED COMPOSITION
Alpha L. Morehouse and Ronald C. Malzahn, Muscatine, Iowa, assignors to Grain Processing Corporation, Muscatine, Iowa, a corporation of Iowa
No Drawing. Filed June 19, 1961, Ser. No. 117,801
29 Claims. (Cl. 99—4)

This invention relates to a poultry feed and more particularly to a poultry feed adapted to increase normal pigmentation in the skins and shanks of poultry and the yolks of eggs.

The problem of obtaining adequate pigmentation in poultry and eggs has attracted considerable attention in recent years largely because modern methods of raising chickens require the use of high-energy, low-fiber rations which are deficient in the yellow pigments providing the natural color of skin and yolk. Since a well pigmented broiler is preferred in many areas of the country it is important that the producer be able to supply birds having the desired degree of pigmentation. It is well recognized by poultry nutritionists that the principal pigment involved in pigmenting the skin and body fat of chickens and the yolk of eggs is the carotenoid lutein, generally referred to as xanthophyll (a class term meaning hydroxy-carotenoids). The problem of obtaining adequate pigmentation, therefore, is that of finding a suitable source of xanthophyll to include in the rations. To be more specific, the problem is one of finding a source of xanthophyll which is rich in the principal pigmenting compound, lutein.

At the present time the formulation of feeds with adequate pigmenting properties is largely dependent on using feed ingredients which are natural sources of xanthophyll. Yellow corn is the most common source of xanthophyll in poultry feeds; however, the xanthophyll content of this feedstuff is too low to provide optimum pigmentation. Furthermore, in some areas of the country it is desirable to replace the yellow corn with other feedstuffs such as milo or barley which are very low in xanthophyll content. Consequently, it is necessary to add one or more additional sources of xanthophyll to the ration in order to provide optimum pigmentation. Corn gluten meal and alfalfa meal are often added for this purpose.

The use of alfalfa meal and corn gluten meal for raising the xanthophyll content of poultry feeds has certain disadvantages which are well recognized by poultry nutritionists. For one thing, the xanthophyll potency of both of these materials varies quite widely thus requiring extensive and frequent revision of feed formulas in order to control the amount of xanthophyll in the ration. Moreover, the xanthophyll activity in alfalfa meal and corn gluten meal is difficult to stabilize which further adds to the difficulty of knowing its potency in the natural materials. Corn gluten meal is not produced in sufficient quantities to satisfy all the requirements for supplementary xanthophyll. Alfalfa meal, being high in fiber and low in energy, is not used extensively in modern, high-energy broiler rations. The xanthophyll content of alfalfa has also been shown to be very poorly utilized for pigmentation. The most successful commercial xanthophyll products offered to the feed trade up to this time have been prepared from extracts of alfalfa or yellow corn. These concentrates have not been available on a regular basis, are often expensive and generally difficult to stabilize. Thus it is apparent that there is a real need for a concentrated source of xanthophyll for supplementing poultry feeds.

The present invention provides a feed composition comprising a major amount of a nutritive base ration and a minor amount of a dried algae meal sufficient to enhance the skin pigmenting properties of the feed. The algae meal employed in the composition of the invention has a high xanthophyll content in a form in which it is effectively utilized by poultry for pigmentation of skin and shanks of broilers and for pigmentation of egg yolks. A particularly effective and preferred feed composition of the invention comprises a major amount of a nutritive base ration, a minor amount of the dried algae meal and a small amount of a stabilizing agent which enhances and prevents deterioration of the skin pigmenting properties of the algae meal.

The type of algae which has been found particularly useful for enhancing the skin pigmenting properties of poultry feeds is that obtained by cultivation of algae under submerged heterotrophic conditions. Particularly advantageous and therefore preferred for use in the present invention are the algae cells obtained by the process described in United States Patent 2,949,700 which issued August 23, 1960, to Henry R. Kathrein. According to the process of the said Kathrein patent green algae of the division Chlorophyta are cultivated in an aqueous organic nutrient medium containing a fermentable carbohydrate, proteinaceous material and urea. The algae cells are separated in the form of an aqueous slurry from the fermentation liquor by decantation or centrifugation and dried. The dried algae cells exist in the form of a dry free-flowing meal and can be readily incorporated with a dry nutritive base ration. Algae which in accordance with the present invention have been found particularly suitable for use in feed compositions are those of the genus Spongiococcum and the genus Coccomyxa. A preferred species of the genus Spongiococcum is *excentricum*, and of the genus Coccomyxa the preferred species is *elongata*. Algae of these genera are unique with respect to the high efficiency of utilization of the xanthophyll which is obtained. Typical analysis of a preferred algae meal of the culture *Spongiococcum excentricum* produced under heterotrophic conditions is as follows:

TABLE I

| | Percent |
|---|---|
| Moisture | 9 |
| Protein | 32 |
| Fat | 4 |
| Fiber | 1 |
| Ash | 6 |

| Vitamins: | Mg./lb. |
|---|---|
| Riboflavin | 9 |
| Thiamine | 12 |
| Beta-carotene | 250 |
| Niacine | 35 |
| Choline | 250 |
| Pantothenic acid | 10 |
| Vitamin E | 25 |
| Folic acid | 2 |

Any suitable nutritive base ration containing desirable nutrients can be used in the feed composition of the invention. The base ration constitutes the major proportion of the feed composition with the dried algae meal being employed in minor amounts. The specific amount of the dried algae meal to employ in the feed composition is widely variable and depends to a large extent upon the potency of the algae meal and the degree of pigmentation desired in the skin and shanks of the poultry or in the egg yolks. Generally, the dried algae meal is employed in the feed composition in amounts ranging from about 0.1% to 5% by weight. However, under certain conditions such as, for example, changes in the market preferences or in available poultry feedstuffs it may be advantageous or desirable to employ a feed containing considerably higher amounts of the dried algae meal. In such instances the dried algae can be employed in the feed in amounts as high as 10-20% by weight or more.

Illustrative poultry feed rations having desirable skin pigmenting properties prepared in accordance with the invention are shown in the following examples.

*Example 1.—Broiler feed*

|  | Percent | Xanthophyll provided, mg./lb. |
|---|---|---|
| Ground yellow corn | 59.5 | 6 |
| Alfalfa meal | 1 | 1.5 |
| Dried algae meal | 0.5 | 5 |
| Soybean meal | 31 |  |
| Fish meal | 2 |  |
| Dried whey | 2 |  |
| Dicalcium phosphate | 2 |  |
| Calcium carbonate | 1 |  |
| Trace mineral mixture | 0.45 |  |
| Vitamin mixture | 0.55 |  |
| Total | 100.00 | 12.5 |

*Example 2.—Broiler feed*

|  | Percent | Xanthophyll provided, mg./lb. |
|---|---|---|
| Ground yellow corn | 29.4 | 3 |
| Ground milo | 30 | 1.5 |
| Alfalfa meal | 1 | 1.5 |
| Dried algae meal | 0.6 | 6 |
| Soybean meal | 31 |  |
| Fish meal | 2 |  |
| Dried whey | 2 |  |
| Dicalcium phosphate | 2 |  |
| Calcium carbonate | 1 |  |
| Trace mineral mixture | 0.45 |  |
| Vitamin mixture | 0.55 |  |
| Total | 100.00 | 12 |

*Example 3.—Broiler feed*

|  | Percent | Xanthophyll provided, mg./lb. |
|---|---|---|
| Ground milo | 59 | 3 |
| Dried algae meal | 1.0 | 10 |
| Soybean meal | 31 |  |
| Fish meal | 2 |  |
| Dried whey | 2 |  |
| Dicalcium phosphate | 2 |  |
| Calcium carbonate | 1 |  |
| Trace mineral mixture | 0.45 |  |
| Vitamin mixture | 0.45 |  |
| Total | 100.00 | 13 |

The three examples set forth above show poultry rations which are similar in basic composition but differ in the amount of xanthophyll provided by the dried algae meal and other ingredients. It can be seen from these examples that dried algae meal can be employed as the major source of xanthophyll as in Example 3, or as a supplementary source as in Example 2.

*Example 4*

In order to demonstrate the increased pigmentation produced when a dried algae meal is incorporated in poultry feeds, in accordance with the invention, groups of chickens were fed diets corresponding to those shown in Examples 1, 2 and 3 above, except that the dried algae meal was omitted and added as a separate supplement. The dried algae meal was prepared by the method described in United States Patent 2,949,700 and the algae culture was *Spongiococcum excentricum*. At the end of the feeding test pigmentation was determined by extracting the pigments from the toe of each bird and measuring them colorimetrically at a wave length of 450 millimicrons. The pigmentation, reported as micrograms of beta-carotene equivalents per gram of tissue, was as follows:

TABLE 2

| | Diet | Pigmentation, mcg. carotene/gm. |
|---|---|---|
| 1 | 60% yellow corn+1% alfalfa meal | 4.77 |
| 2 | 60% yellow corn+1% alfalfa meal+0.78% dried algae | 8.97 |
| 3 | 30% milo+30% yellow corn+1% alfalfa meal | 3.62 |
| 4 | 30% milo+30% yellow corn+1% alfalfa meal+0.78% dried algae | 7.84 |
| 5 | 60% milo | 0.60 |
| 6 | 60% milo+0.63% dried algae | 2.90 |
| 7 | 60% milo+1.26% dried algae | 4.88 |
| 8 | 60% milo+2.35% dried algae | 8.27 |
| 9 | 60% milo+3.90% dried algae | 11.92 |

The above results show clearly the marked increase in shank pigmentation produced by the addition to the poultry feed of the dried algae meal.

*Example 5*

Algae of the genera Spongiococcum and Coccomyxa are unique with respect to skin pigmenting ability as is seen from the following experimental data. In these particular tests a group of dried algae meals were prepared using several strains of algae and fed to the broilers at levels supplying equivalent amounts of xanthophyll. The degree of pigmentation was determined at the end of the feeding period. The pigmentation results reported as micrograms of beta-carotene equivalents per gram of tissue were as follows:

TABLE 3

| Test | Type of Algae | Xanth. Level, mg./lb. | Pigmentation, mcg. carotene/gm. |
|---|---|---|---|
| 1 | Spongiococcum excentricum | 4 | 3.59 |
|  | Chlorella | 4 | 1.61 |
|  | Coccomyxa | 4 | 4.77 |
| 2 | Spongiococcum excentricum | 8 | 5.79 |
|  | Chlorella | 8 | 2.99 |

*Example 6*

In order to show the effect of algae on the pigmentation of egg yolks, a dried algae meal was added to a commercial egg ration and fed to caged hens. The algae meal was the same as that employed in Example 4. Each treatment involved four caged hens and after allowing two weeks on the test diets the average yolk color for each hen was determined over a one week period. Yolk color was determined by measuring the color of an acetone extract on a colorimeter at a wave length of 450 millimicrons. The yolk pigmentation is reported as micrograms of beta-carotene equivalents per gram of tissue. The average results are shown below:

TABLE 4

EFFECT ON YOLK COLOR OF ADDING ALGAE MEAL TO A COMMERCIAL EGG RATION

| Diet | Pigmentation of Yolk, mcg. carotene/gm. | | |
|---|---|---|---|
| | Trial 1 | Trial 2 | Avg. |
| Basel | 29.3 | 35.2 | 32.3 |
| Basel+0.5% Algae | 55.7 | 55.4 | 55.1 |
| Basel+1.0% Algae | 69.7 | 53.7 | 61.7 |
| Basel+2.0% Algae | 76.1 | 75.7 | 76.0 |

As stated previously, stabilizing agents are employed in the preferred feeding composition of the invention to enhance the pigmenting properties and to protect the algae meal from oxidative deterioration. In general, any of the chemical antioxidants known to the art which retard the oxidation of carotenoid compounds can be employed. Such chemical antioxidants include, for example, butylated hydroxyanisole, butylated hydroxytoluene, 6-ethoxy-1, 2 dihydroxy 2,2,4 trimethylquinoline, N, N-diphenylparaphenylenediamine and the like. These chemical antioxidants are employed in amounts ranging from about 0.01 to 5% of the dry weight of the algae.

In addition to the known chemical antioxidants described above, further stabilization and enhancement of the pigmenting properties of the dried algae meal is achieved by incorporating with the algae meal materials such as molasses, corn steep liquor, distiller solubles, dextrins, starch, corn syrups, bone glue, gelatine and gums. The exact manner in which these materials function to enhance the stability of the algae is not known. One possible explanation is that these materials form a film or coating around the algae cells which acts as a barrier and prevents atmospheric oxygen from attacking the cells. These stabilizing agents are employed in amounts ranging from about 10 to 50% of the dry weight of the algae. Conveniently, the chemical antioxidants and other stabilizing agents which are employed in the preferred feed composition of the invention are added and thoroughly mixed into the slurry containing the algae cells after separation of the fermentation liquor. The aqueous mixture of the algae cells, chemical antioxidants and other stabilizing agents can then be dried on a steam-heated drum drier, for example, and ground to a meal suitable for addition to poultry feeds.

*Example 7*

In order to demonstrate the function of the antioxidants in preserving the pigmenting properties of the dried algae meal a poultry feeding test was conducted. In this test the poultry feeds utilized comprised (1) a nutritive base ration, (2) a nutritive base ration together with a minor amount of an algae meal, and (3) a feed containing the nutritive base ration, algae and an antioxidant. The algae meals employed in this test were stored at room temperature for one year prior to being fed to chickens. At the end of the feeding period the degree of pigmentation was determined by extracting the pigments from one toe of each bird and measuring them colorimetrically at a wave length of 450 millimicrons. The results reported as microgram equivalents of beta-carotene per gram of tissue were as follows:

TABLE 5

| Diet | Antioxidant | Pigmentation, mcg./gm. |
| --- | --- | --- |
| Base Ration | None | 1.4 |
| Base+0.75% algae meal | do | 2.85 |
| Do | .0075% 1,2-dihydro-6-ethoxy-2,2,4-trimethyl-quinoline. | 7.02 |

As can be seen from the above results, the feed containing the algae and an antioxidant exhibited excellent pigmenting properties even after storage of the algae for a year.

*Example 8*

A quantity of fermentation broth produced by heterotrophic cultivation was centrifuged and the algae separated as a thick slurry having a solids content of 33% on a dry weight basis. The algae material was dried on a steam heated pilot model drum drier and the dried material assayed for xanthophyll. A number of samples of the dried algae were treated as shown in the following table and were stored at a temperature of 45° C. for 90 days, after which the samples were reassayed to determine xanthophyll stability. The chemical antioxidant employed was 1,2-dihydro-6-ethoxy-2,2,4-trimethylquinoline. The results obtained were:

TABLE 6

| Sample Treatment | Percent Xanthophyll Retained | |
| --- | --- | --- |
| | No antioxidant | 0.2% antioxidant |
| Algae (alone) | 45 | 56 |
| 30% Corn Steep Liquor | 52 | 80 |
| 30% Molasses | 62 | 77 |

As is apparent from the foregoing description, algae of the genera Spongiococcum and Coccomyxa produced under heterotrophic conditions are particularly advantageous and useful for incorporation in poultry feeds to enhance the skin or egg yolk pigmenting properties thereof. A desired pigmentation in the skin and shanks of poultry or in egg yolks can be achieved by incorporating small, predetermined amounts of the dried algae cells in the poultry feed. The poultry feed compositions of the present invention containing the dried algae cells together with the various stabilizing agents can be stored for extended periods of time without any appreciable impairment of the pigmenting properties of the feed.

Those modifications and equivalents which fall within the spirit of the invention and the scope of the appended claims are to be considered part of the invention.

We claim:

1. A poultry feed comprising a major amount of a nutritive base ration and a minor amount sufficient to enhance the pigmenting properties of the feed of heterotrophically cultivated dried algae cells selected from the group consisting of *Spongiococcum excentricum* and *Coccomyxa elongata*.

2. A poultry feed comprising a major amount of a nutritive base ration and more than about 0.1% by weight of the feed of heterotrophically cultivated dried algae cells selected from the group consisting of *Spongiococcum excentricum* and *Coccomyxa elongata*.

3. A poultry feed comprising a major amount of a nutritive base ration and from about 0.1% to about 5% by weight of the feed of heterotrophically cultivated dried algae cells selected from the group consisting of *Spongiococcum excentricum* and *Coccomyxa elongata*.

4. A poultry feed comprising a major amount of a nutritive base ration and a minor amount sufficient to enhance the pigmenting properties of the feed of heterotrophically cultivated dried algae cells of the culture *Spongiococcum excentricum*.

5. A poultry feed comprising a major amount of a nutritive base ration and more than about 0.1% of heterotrophically cultivated dried algae cells of the culture *Spongiococcum excentricum*.

6. A poultry feed comprising a major amount of a nutritive base ration and a minor amount sufficient to enhance the pigmenting properties of the feed of heterotrophically cultivated dried algae cells of the culture *Coccomyxa elongata*.

7. A poultry feed comprising a major amount of a nutritive base ration and more than about 0.1% of heterotrophically cultivated dried algae cells of the culture *Coccomyxa elongata*.

8. A poultry feed comprising a major amount of a nutritive base ration and a minor amount sufficient to enhance the pigmenting properties of the feed of heterotrophically cultivated dried algae cells selected from the group consisting of *Spongiococcum excentricum* and *Coccomyxa elongata* and a small amount of an antioxidant capable of retarding oxidation of carotenoid compounds.

9. A poultry feed comprising a major amount of a nutritive base ration and a minor amount sufficient to enhance the pigmenting properties of the feed of heterotrophically cultivated dried algae cells selected from the group consisting of *Spongiococcum excentricum* and

*Coccomyxa elongata* having admixed therewith a stabilizing agent selected from the group consisting of molasses, corn steep liquor, distiller solubles, dextrins, starch, corn syrup, bone glue, gelatine and natural gums.

10. A poultry feed comprising a major amount of a nutritive base ration and from about 0.1% to about 5% by weight of the feed of heterotrophically cultivated dried algae cells selected from the group consisting of *Spongiococcum excentricum* and *Coccomyxa elongata* having admixed therewith a stabilizing agent selected from the group consisting of molasses, corn steep liquor, distiller solubles, dextrins, starch, corn syrup, bone glue, gelatine and natural gums.

11. A poultry feed comprising a major amount of a nutritive base ration and a minor amount sufficient to enhance the pigmenting properties of the feed of heterotrophically cultivated dried algae cells selected from the group consisting of *Spongiococcum excentricum* and *Coccomyxa elongata* having admixed therewith a stabilizing agent selected from the group consisting of molasses, corn steep liquor, distiller solubles, dextrins, starch, corn syrup, bone glue, gelatine and natural gums, and a small amount of an antioxidant capable of retarding oxidation of carotenoid compounds.

12. A poultry feed comprising a major amount of a nutritive base ration and from about 0.1% to about 5% by weight of the feed of heterotrophically cultivated dried algae cells selected from the group consisting of *Spongiococcum excentricum* and *Coccomyxa elongata* having admixed therewith a stabilizing agent selected from the group consisting of molasses, corn steep liquor, distiller solubles, dextrins, starch, corn syrup, bone glue, gelatine and natural gums, and a small amount of an antioxidant capable of retarding oxidation of carotenoid compounds.

13. A poultry feed comprising a major amount of a nutritive base ration and a minor amount sufficient to enhance the pigmenting properties of the feed of dried algae cells selected from the group consisting of *Spongiococcum excentricum* and *Coccomyxa elongata*, the said algae cells being cultivated under heterotrophic conditions in an aqueous organic nutrient medium containing a fermentable carbohydrate, a proteinaceous material and urea.

14. A poultry feed comprising a major amount of a nutritive base ration and more than about 0.1% by weight of the feed of dried algae cells selected from the group consisting of *Spongiococcum excentricum* and *Coccomyxa elongata*, the said algae cells being cultivated under heterotrophic conditions in an aqueous organic nutrient medium containing a fermentable carbohydrate, a proteinaceous material and urea.

15. A poultry feed comprising a major amount of a nutritive base ration and from about 0.1% to about 5% by weight of the feed of dried algae cells selected from the group consisting of *Spongiococcum excentricum* and *Coccomyxa elongata*, the said algae cells being cultivated under heterotrophic conditions in an aqueous organic nutrient medium containing a fermentable carbohydrate, a proteinaceous material and urea.

16. A poultry feed comprising a major amount of a nutritive base ration and a minor amount sufficient to enhance the pigmenting properties of the feed of dried algae cells selected from the group consisting of *Spongiococcum excentricum* and *Coccomyxa elongata* and a small amount of an antioxidant capable of retarding oxidation of carotenoid compounds, the said algae cells being cultivated under heterotrophic conditions in an aqueous organic nutrient medium containing a fermentable carbohydrate, a proteinaceous material and urea.

17. A poultry feed comprising a major amount of a nutritive base ration and a minor amount sufficient to enhance the pigmenting properties of the feed of heterotrophically cultivated dried algae cells selected from the group consisting of *Spongiococcum excentricum* and *Coccomyxa elongata* having admixed therewith a stabilizing agent selected from the group consisting of molasses, corn steep liquor, distiller solubles, dextrins, starch, corn syrup, bone glue, gelatine and natural gums, the said algae cells being cultivated under heterotrophic conditions in an aqueous organic nutrient medium containing a fermentable carbohydrate, a proteinaceous material and urea.

18. A process for producing pigmentation in the skin of poultry and in egg yokes obtained therefrom which comprises feeding to the poultry a feed comprising a major amount of a nutritive base ration and a minor amount sufficient to enhance the pigmenting properties of the feed of heterotrophically produced dried algae cells selected from the group consisting of *Spongiococcum excentricum* and *Coccomyxa elongata*.

19. A process for producing pigmentation in the skin of poultry and in egg yokes obtained therefrom which comprises feeding to the poultry a feed comprising a major amount of a nutritive base ration and from about 0.1% to about 5% by weight of the feed of heterotrophically cultivated dried algae cells selected from the group consisting of *Spongiococcum excentricum* and *Coccomyxa elongata*.

20. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of heterotrophically cultivated dried algae cells of the culture *Spongiococcum excentricum*.

21. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of heterotrophically cultivated dried algae cells of the culture *Coccomyxa elongata*.

22. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of heterotrophically cultivated dried algae cells selected from the group consisting of *Spongiococcum excentricum* and *Coccomyxa elongata* and a small amount of an antioxidant capable of retarding oxidation of carotenoid compounds.

23. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of heterotrophically cultivated dried algae cells selected from the group consisting of *Spongiococcum excentricum* and *Coccomyxa elongata* having admixed therewith a stabilizing agent selected from the group consisting of molasses, corn steep liquor, distiller solubles, dextrins, starch, corn syrup, bone glue, gelatine and natural gums.

24. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of dried algae cells selected from the group consisting of *Spongiococcum excentricum* and *Coccomyxa elongata*, the said algae cells being cultivated under heterotrophic conditions in an aqueous organic nutrient medium containing a fermentable carbohydrate, a proteinaceous material and urea.

25. A process for producing pigmentation in the skin of poultry and in egg yolks obtained therefrom which comprises feeding to the poultry a feed comprising a major amount of a nutritive base ration and from about 0.1% to about 5% by weight of the feed of dried algae cells selected from the group consisting of *Spongiococcum excentricum* and *Coccomyxa elongata*, the said algae cells being cultivated under heterotrophic conditions in an aqueous organic nutrient medium containing a fermentable carbohydrate, a proteinaceous material and urea.

26. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of dried algae cells of the culture *Spongiococcum excentricum*, the said algae cells being cultivated under heterotrophic conditions in an aqueous organic nutrient medium containing a fermentable carbohydrate, a proteinaceous material and urea.

27. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of dried algae cells of the culture *Coccomyxa elongata*, the said algae cells being cultivated under heterotrophic conditions in an aqueous organic nutrient medium containing a fermentable carbohydrate, a proteinaceous material and urea.

28. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of dried algae cells selected from the group consisting of *Spongiococcum excentricum* and *Coccomyxa elongata* and a small amount of an antioxidant capable of retarding oxidation of carotenoid compounds, the said algae cells being cultivated under heterotrophic conditions in an aqueous organic nutrient medium containing a fermentable carbohydrate, a proteinaceous material and urea.

29. A process for producing pigmentation in the skin of poultry and in egg yolks obtained therefrom which comprises feeding to the poultry a feed comprising a major amount of a nutritive base ration and a minor amount sufficient to enhance the pigmenting properties of the feed of dried algae cells selected from the group consisting of *Spongiococcum excentricum* and *Coccomyxa elongata* having admixed therewith a stabilizing agent selected from the group consisting of molasses, corn steep liquor, distiller solubles, dextrins, starch, corn syrup, bone glue, gelatine and natural gums, the said algae cells being cultivated under heterotrophic conditions in an aqueous organic nutrient medium containing a fermentable carbohydrate, a proteinaceous material and urea.

References Cited by the Examiner

UNITED STATES PATENTS

| | | | |
|---|---|---|---|
| 2,856,286 | 10/1958 | Delarche | 99—9 |
| 2,949,700 | 8/1960 | Kathrein | 47—58 |
| 3,081,171 | 3/1963 | Reiners et al. | 99—2 |

OTHER REFERENCES

Pruess et al.: Applied Microbiology, vol. 2, No. 3, May 1954, pp. 125–130.

A. LOUIS MONACELL, *Primary Examiner.*

D. J. DONOVAN, *Assistant Examiner.*